US005647008A

United States Patent [19]

Farhangi et al.

[11] Patent Number: 5,647,008

[45] Date of Patent: Jul. 8, 1997

[54] METHOD AND APPARATUS FOR DIGITAL MIXING OF AUDIO SIGNALS IN MULTIMEDIA PLATFORMS

[75] Inventors: Hassan Farhangi; Nookala Satya Krishna Mohan, both of Singapore, Singapore

[73] Assignee: Aztech Systems Ltd., Aztech Building, Singapore

[21] Appl. No.: 392,142

[22] Filed: Feb. 22, 1995

[51] Int. Cl.[6] .......... H04B 1/00

[52] U.S. Cl. .......... 381/119

[58] Field of Search .......... 381/119, 117, 381/109, 107, 98

[56] References Cited

U.S. PATENT DOCUMENTS 4,360,707 11/1982 Joseph et al. .......... 381/117
5,402,499 3/1995 Robinson et al. .......... 381/119
5,487,067 1/1996 Matsushige .......... 381/119

OTHER PUBLICATIONS

Crochiere, Ronald E. and Rabiner, Lawrence R., "Interpolation and Decimation of Digital Signals", Proceedings of the IEEE, vol. 69, No. 3, pp. 300–331, Mar., 1981.
Analog Devices "SamplePort Stereo Asynchronous Same Rate Converters" AD1890/AD1891, Rev. 0, pp. 1–20, Jul. 1993.

*Primary Examiner*—Curtis Kuntz
*Assistant Examiner*—Vivian Chang
*Attorney, Agent, or Firm*—Albert C. Smith; Christopher M. Tobin

[57] ABSTRACT

A multimedia method and apparatus is able to digitally mix audio signals to produce combined audio output signals. Prior to digital mixing, the audio input signals are de-formatted using a digital de-formatter, volume adjusted using digital volume controllers and converted to a common sampling rate utilizing a digital interpolator or decimator.

22 Claims, 10 Drawing Sheets

METHOD AND APPARATUS FOR DIGITAL MIXING OF AUDIO SIGNALS IN MULTIMEDIA PLATFORMS

TECHNICAL FIELD OF THE INVENTION

The present invention relates generally to multimedia applications and more specifically to a method and an apparatus for digital mixing of audio signals in multimedia platforms.

BACKGROUND OF THE INVENTION

In the personal computing industry, multimedia applications are one of the fastest growing areas of technology that exploit the communication medium of personal computers. Personal computers utilize multimedia platforms or boards 11, such as that shown in the conventional multi-media system of FIG. 1, to mix audio inputs from sources such as compact disc drive 13, digital audio tape drive 15, and auxiliary tape drive 17, and to couple the inputs to a common output, such as speaker 19 or a storage medium. In most cases, the input signals are produced by external equipment which are not controlled by the PC and no control exists concerning signal information content, timing, bandwidth, and resolution. The multimedia platform provides a system and method for individually controlling and mixing all input sources to obtain a desired output.

One of the problems with current multimedia boards is that the quality of the output signal is reduced by analog-to-digital and digital-to-analog conversions of data. The conversions are necessitated by the utilization of hybrid analog-digital circuitry. In such conventional systems as shown in FIG. 1, audio signals from various sources are input to a personal computer in digital form. Prior to mixing, the signals are converted into analog form through digital-to-analog converters (D.A.C.) 21 and the amplitudes of the analog signals are adjusted with analog volume controllers 23. The volume-adjusted, analog signals are mixed by analog mixer 24. Thereafter, the mixed signals may be re-digitized by analog-to-digital converters 25 for digitized transmission externally as to a memory device or may be transmitted within the PC in a conventional format compatible with ISA (Industry Standard Architecture) bus 27 or any other conventional bus architecture and protocol, to a destination. At the destination, the digitized mixed signals may be converted to mixed analog signals through D.A.C. 29, volume adjusted by master volume controller 31, and output as mixed sound waves through speaker 19. Thus, conventional systems, such as shown in FIG. 1, require at least two stages of signal conversion. Those stages include a stage transforming the input signals from digital-to-analog format prior to analog mixing and another stage transforming the mixed signals from analog-to-digital format.

In conventional systems as shown in FIG. 1, processing and storing audio signals introduces noise and distortions into the original wave forms of the audio input signals. For example, audio input signals may be distorted by analog-to-digital conversion prior to storage or digital-to-analog conversion prior to playback. Each such data conversion and corresponding data format change may cause as much as 10 dB degradation in the output signal quality. Thus, the overall quality of the final mixed audio is diminished by the interchange of signal formats.

In addition, volume control, analog mixing, and filtering devices reduce system performance as the devices age or are altered by temperature fluctuations. These effects inject large amounts of noise into analog sub-systems. Further, analog signals may be parsed through band-limiting filters to reduce the amount of memory necessary to store the signals. However, these band-limiting filter techniques provide poor stopband characteristics and their transition bands are not very sharp. Accordingly, there is a need for a multimedia platform that accepts multiple audio input signals, digitally adjusts and mixes the audio input signals, and digitally outputs merged audio signals.

SUMMARY OF THE INVENTION

The invention disclosed herein provides a method and an apparatus for digitally mixing multiple, audio signals having independent sources, sampling rates, and formats. Prior to mixing, multiple audio input signals are converted to a common sampling rate before they are digitally mixed. Preferably, this common sampling rate is chosen in accordance with the specifications as set forth for compact disc (CD) frequency spectrum.

To normalize the signals into a common sampling rate, the audio inputs are either interpolated or decimated at a rate that minimizes the loss of information from the audio input signals. Audio inputs are interpolated if the signal frequencies are lower than the selected common sampling rate. Conversely, audio inputs are decimated for signal frequencies that are higher than the selected common sampling rate.

After the audio inputs have been converted to a common sampling rate, the signals are mixed together in digital format by a digital mixer. Digital mixing of audio inputs minimizes the noise injection into the sound source and reduces the degradation of signal quality due to format transformations. In addition, digital volume controllers and digital speakers are selected for the implementation of the present system to compliment the digital mixing of audio signals.

BRIEF DESCRIPTION OF THE DRAWINGS

FIG. 2(*a*) is a graph illustrating the timing characteristics of a WT audio signal as received by input WT-IN of the preferred embodiment shown in FIG. 2.

FIG. 2(*b*) is a block diagram of a digital volume controller as shown in the preferred embodiment of FIG. 2.

FIG. 2(*c*) is a block diagram of a digital mixer as shown in the preferred embodiment of FIG. 2.

FIG. 3(*b*) is a graph illustrating the spectrum of the interpolated signal after the spectrum of the exemplar sampled signal of FIG. 3(*a*) has been interpolated.

FIG. 4(*b*) is a graph illustrating the sampled signal of FIG. 3(*c*) with extended samples using sample averaging.

FIG. 4(*c*) is a graph illustrating the sampled signal of FIG. 3(*c*) with extended samples using sample repeating.

FIG. 5(*a*) is a block schematic diagram illustrating a finite impulse response (FIR) filter for implementing the poly-phase filter.

DETAILED DESCRIPTION OF THE PREFERRED EMBODIMENTS

Figure 1:
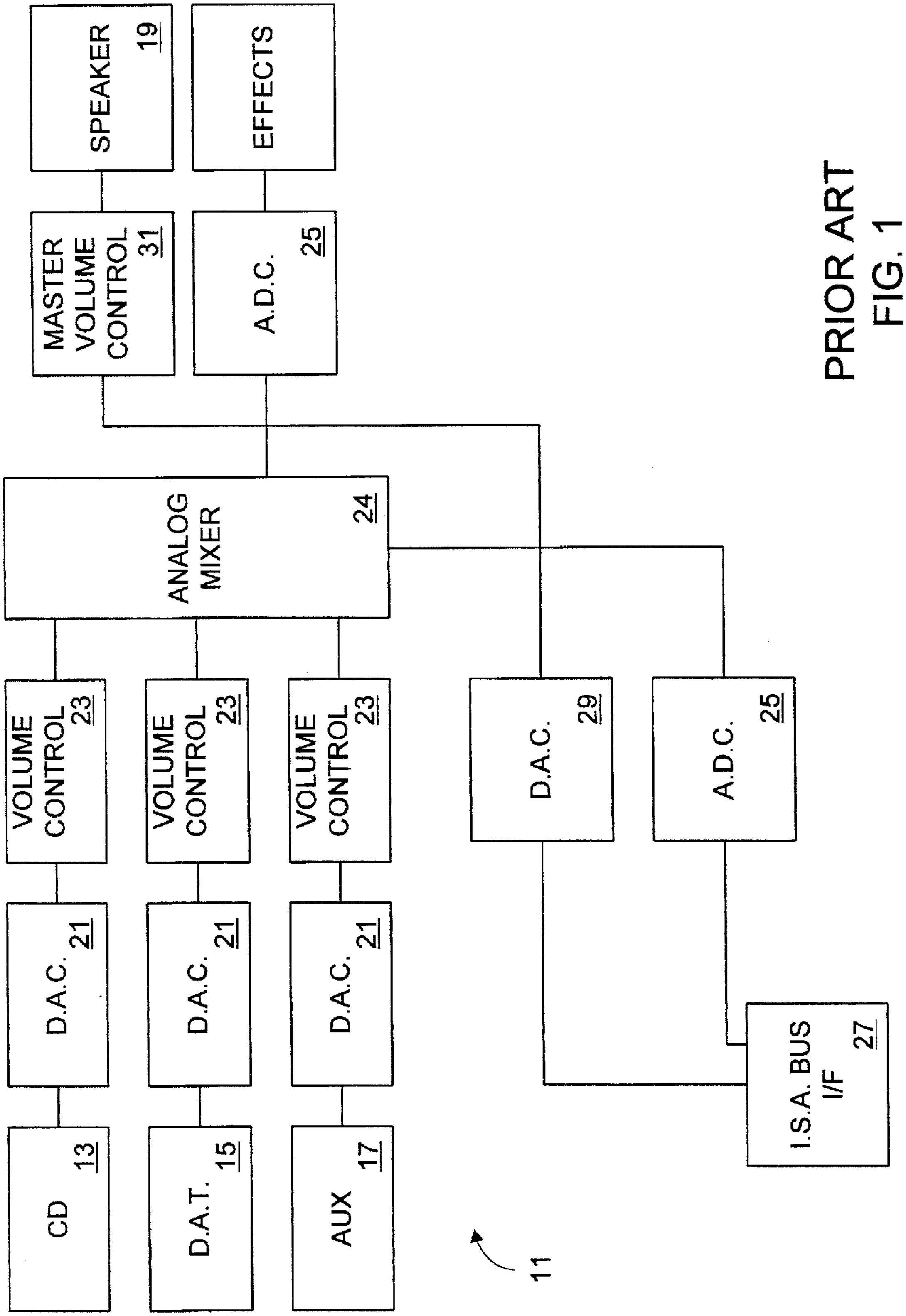
PRIOR ART FIG. 1
FIG. 1 is a block schematic diagram illustrating a conventional scheme of mixing audio signals in multimedia platforms or sound boards.
Figure 2:
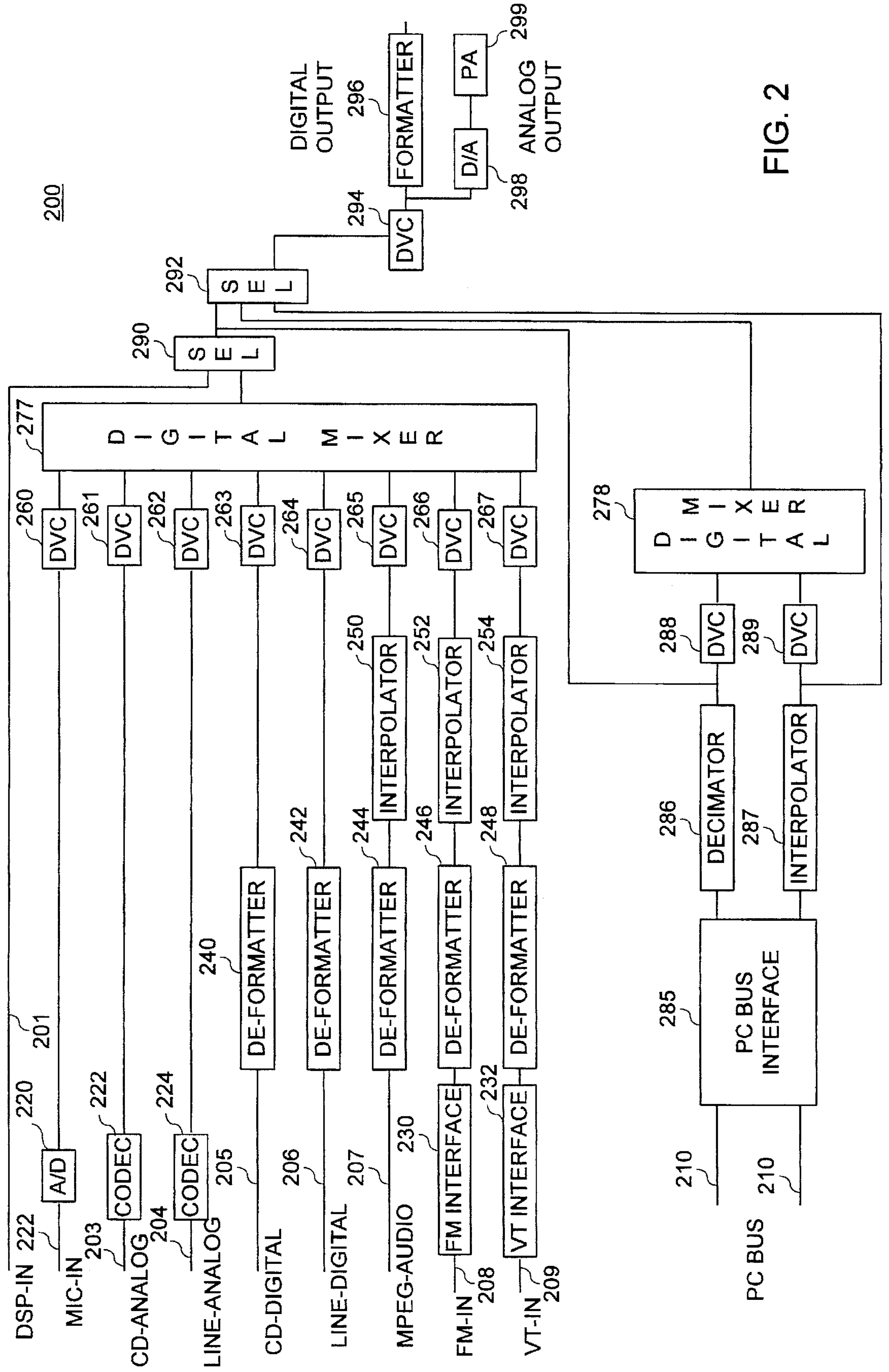
FIG. 2 is a block diagram of one implementation of the preferred embodiment of the present invention, namely the mixed architecture of programmable digital signal processing and hardwired logic.
Figure 2A:
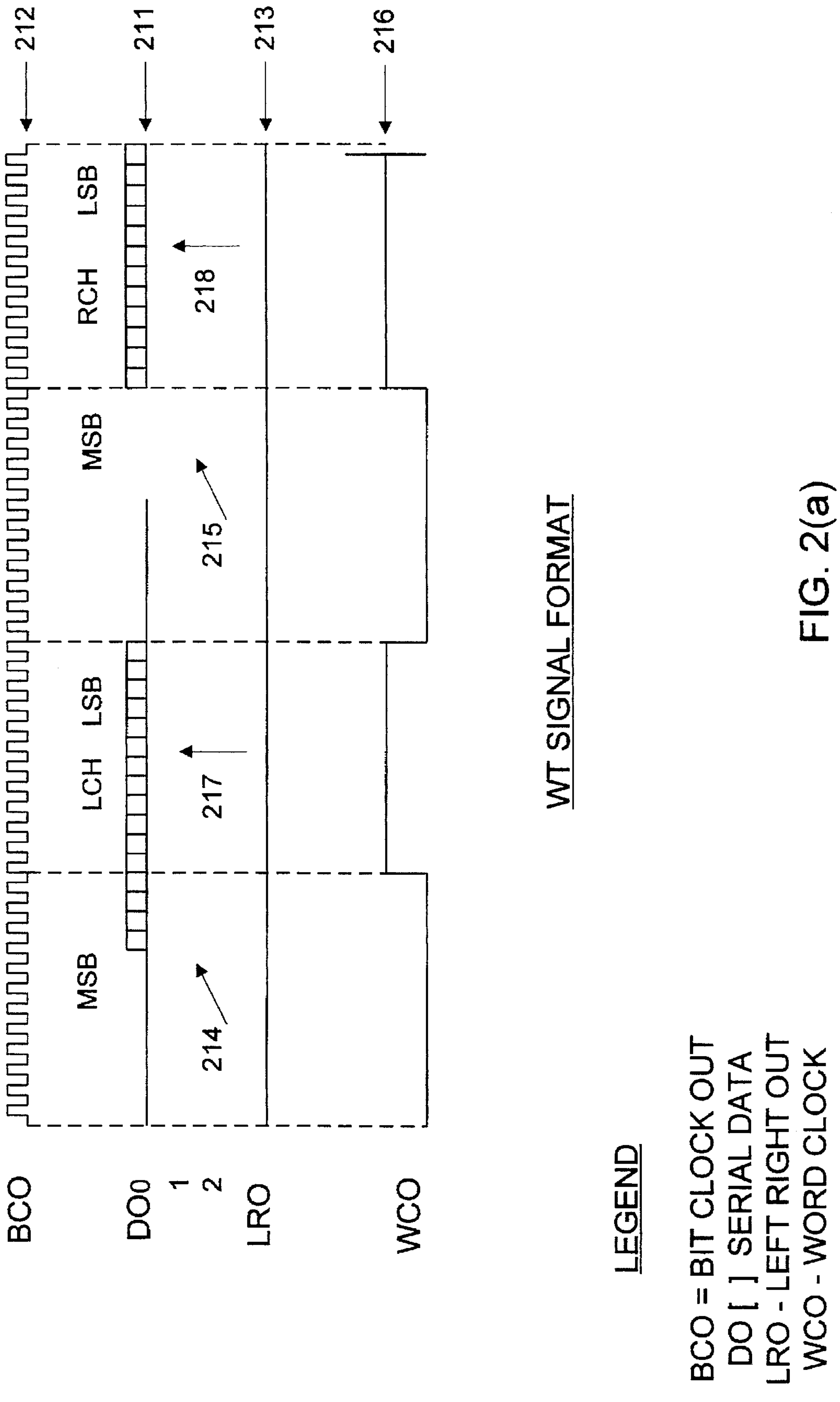
Figure 2B:
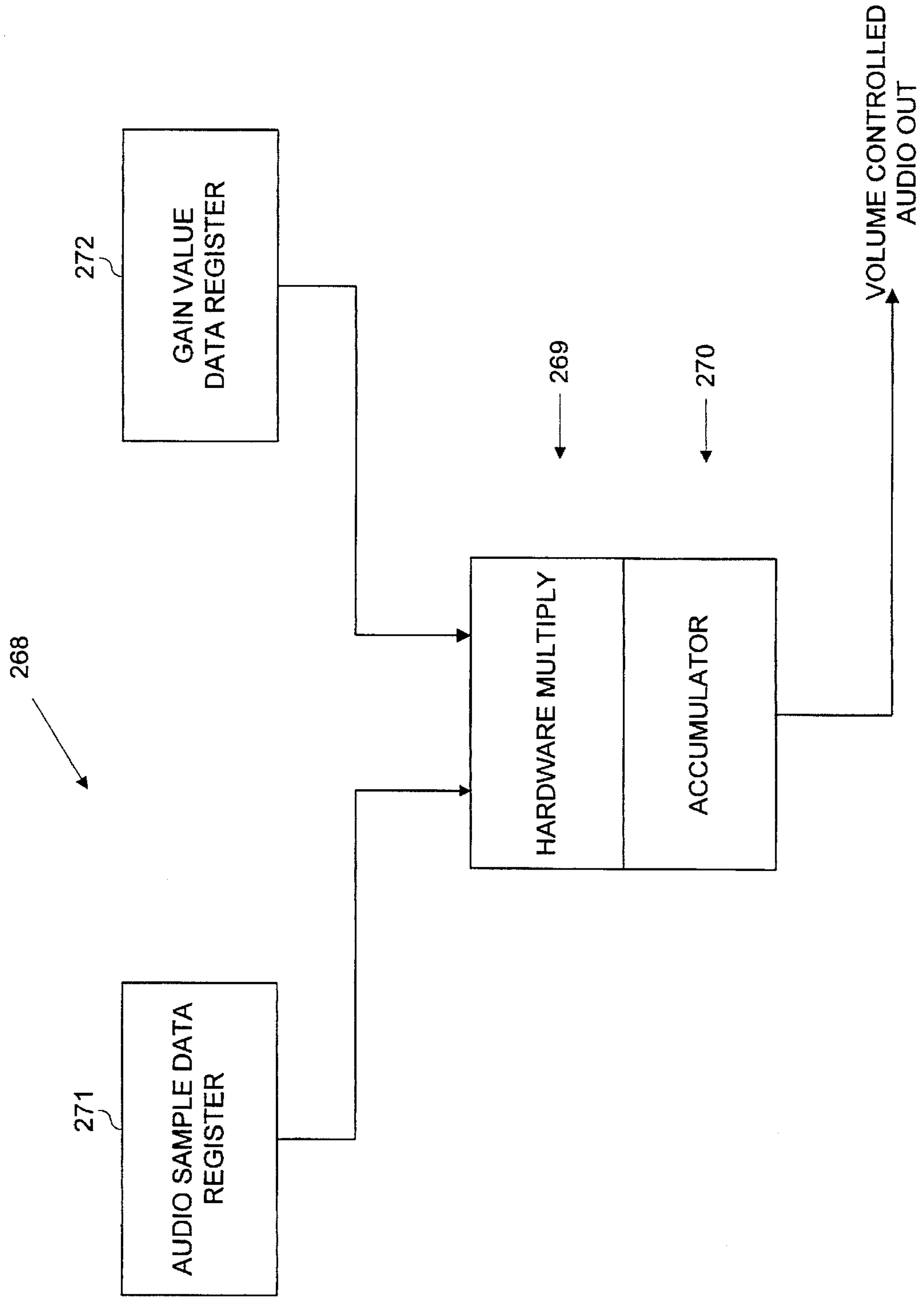
Figure 2C:
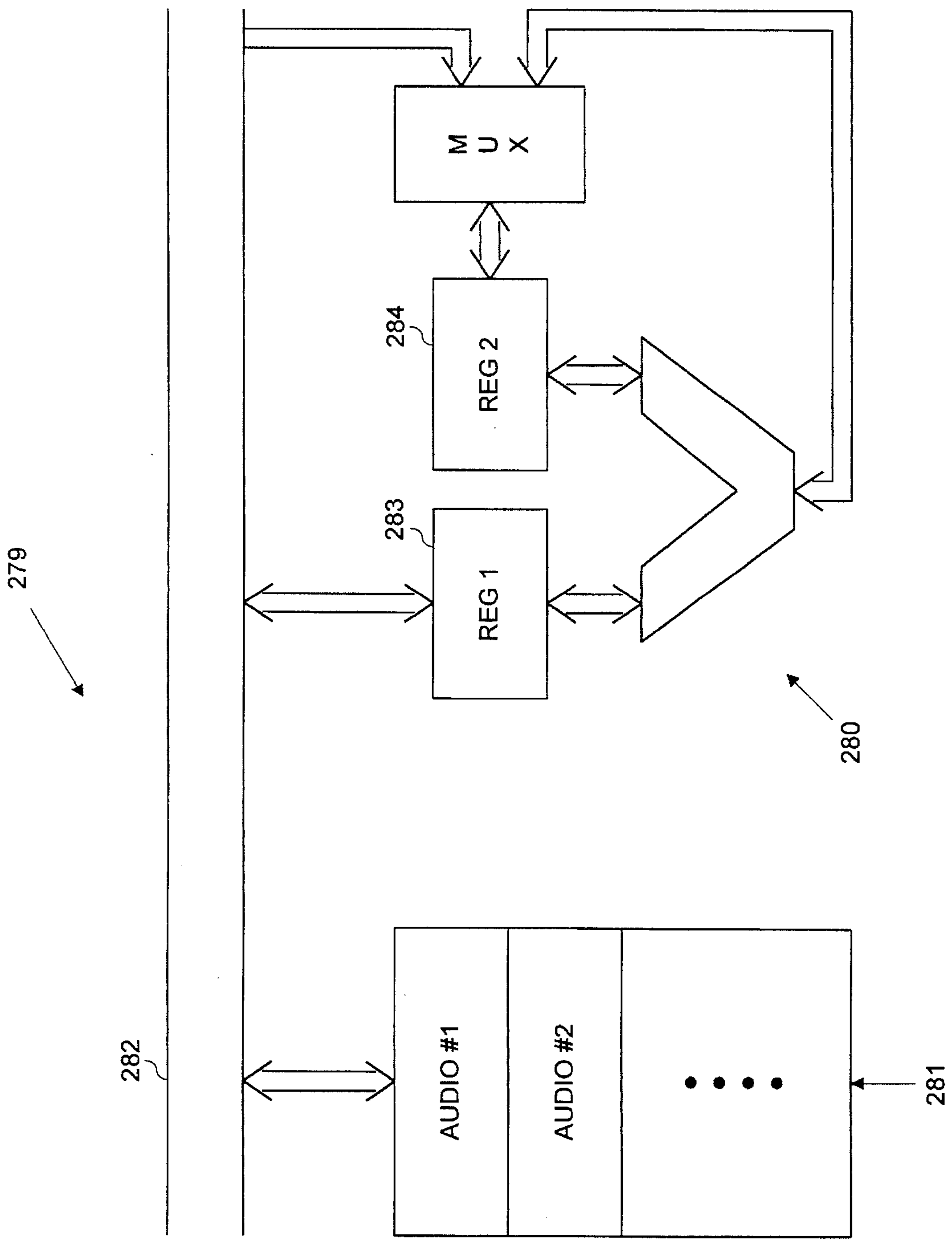

Referring to FIG. 2, there is illustrated an embodiment of the present invention. Multimedia platform 200 digitally mixes multiple audio input signals and outputs combined digital audio signals. Audio inputs are generated from various sources including digital signal processor (DSP-IN) 201, microphone (MIC-IN) 202, compact disc analog (CD-ANALOG) 203, line-analog (LINE-ANALOG) 204, compact disc digital (CD-DIGITAL) 205, Line-digital (LINE-DIGITAL) 206, motion picture experts group standard (MPEG-AUDIO) 207, frequency modulated synthesis (FM-IN) 208, WT synthesis (WT-IN) 209, and personal computer storage (PC BUS) 210. DSP-IN 201 is an input signal generated from a conventional digital signal processor. MIC-IN 202 originates from a microphone where the microphone sound is first amplified by a pre-amplifier and then converted to digital format by an analog-to-digital (A/D) converter 220. CD inputs 203 and 205 come from serial data streams from any standard CD audio interface. CD-Analog input 203 is converted into 16-bit stereo digital data using A/D converter 220.

CD-digital input 205 receives CD-digital audio signals in conventional EBU format. The CD-digital signals are de-formatted using EBU de-formatter 240, which is commercially available. EBU formatted data is delivered in basic units, called sub-frames, which are 32-bits long and which contain a 24-bit data field. The sub-frames are de-formatted to digitally extract the 24-bit data field containing the raw audio data. Each of the deformatters 242, 244, 246, 248 is commercially available and operates similarly with the respective input signals to digitally extract raw audio data.

Line-Digital input 206 receives line-digital audio signals from a conventional digital power amplifier in conventional EBU format. The line-digital signals are de-formatted using EBU de-formatter 242, which is commercially available, to digitally extract the raw audio data.

MPEG-Audio input 207 receives MPEG-digital audio signals from a conventional source utilizing MPEG (Motion Picture Experts Group) standard format. The MPEG-digital signals are de-formatted using MPEG de-formatter 244, which is commercially available, to digitally extract the raw audio data.

FM-IN input 208 receives a serial, stereo, FM (frequency modulated) data stream with a variable sampling rate. FM interface 230 descrambles and isolates the selected FM-digital signals. De-formatter 246 digitally extracts the raw audio data.

WT-IN input 209 receives a digital audio signal in conventional WT format, and which, similar to FM signal format, has a variable sampling rate. Commercially available, WT interface 232 isolates the selected WT-digital signals. Commercially available WT de-formatter 248 digitally extracts the raw audio data.

For exemplar purposes of showing a data string that requires de-formatting, FIG. 2(*a*) illustrates a WT signal format including a string of serial data bits 211. Bit (BCO) clock 212 provides a bit clock cycle which may be used to latch the transmission of each sequential bit in string 211. Left-right (LRO) clock 213 provides an LRO clock cycle for coordinating the transmission of left data field 214 and right data field 215. Word (WCO) clock 216 provides a WCO clock cycle for coordinating the transmission of left data word 217 and right data word 218. Left data word 217 and right data word 218 provide the input for left and right channel, raw audio data signals. WCO clock 216 and LRO clock 213 are both synchronized with respective falling edges of BCO clock 212.

These audio signals can vary both in bandwidth spectrum and in the clarity of the resolution such that the signals are interpolated or decimated to convert the signals into a common sampling rate. The compact disc (CD) input signals in many instances provide the highest signal quality and have a sampling rate that is higher than most other input signals; therefore, the CD sampling frequency is selected as the common sampling rate to which each of the other input signals is conformed. Interpolators 287, 250, 252, and 254 interpolate sampling frequencies that are lower than the selected common sampling rate. Decimator 286 decimates sampling frequencies that are higher than the selected common sampling rate.

Digital data bits in audio signal words from the respective inputs 201-210 may be multiplicatively increased or decreased in magnitude with digital volume controllers (DVC) 260–7, 288–9 to obtain corresponding volume adjustments of sound produced from said audio signal words.

An example of a multiply DVC block diagram circuit is shown in FIG. 2(*b*), wherein DVC 268 is implemented within DSP hardware including multiplier 269 and accumulator 270. Audio data is input to multiplier 269 from audio sample data register 271 and a volume gain factor is provided to multiplier 269 by gain value data register 272. The audio data and volume gain factor are multiplied by multiplier 269 and accumulated by accumulator 270 for output on completion of the multiply operation. The volume gain factor may be selected by a user through a volume control instruction, enabling user-defined multiply operations of respective input signals.

Digital mixer 277 combines the various digital signals by adding audio words that correspond to the same sampling instant. The preferred hardware embodiment contemplates that the digital signals which enter the digital mixer have 16-bit wordlengths. Digital mixer 277 may be implemented using gate array ASIC technology or within a DSP. An exemplar implementation of a DSP-implemented, digital mixer block diagram circuit is shown in FIG. 2(*c*), wherein digital mixer 279 includes adder (ACC) 280 for accumulating the combined audio input signal. Parallel audio input signals may be stored in register stack 281 connecting to adder 280 through bus 282. During each clock cycle, the audio word stored at the top of stack 281 may be popped and delivered to temporary register (REG 1) 283. During a next clock cycle, the contents of register 283 may be added in adder 280 with the contents of register 284. During a next clock cycle, the contents of adder 280 are stored in register 284, and, the next audio word is popped from stack 281 and stored in register 283. The adding step is continued until all audio input signals for a given sample instant have been accumulated into a combined audio input signal.

PC Bus Interface 285 facilitates data transfers and communications between PC bus 210, and decimator 286 and interpolator 287. In the digital signal processor (DSP) implementation, PC Bus Interface 285 provides several functional features in the programmable environment which may allow the user to define the sampling rate of various inputs, set the desired gain level for both the input and output signals, and specify the compression factor used for the storing of audio data in the memory. In addition, multiplexer 290 selects between the inputs generated from the output of digital mixer 277 or from DSP-In 201, and multiplexer 292 chooses among three selectable input sources: decimator 286, interpolator 287, or digital mixer 278.

Figure 3A:
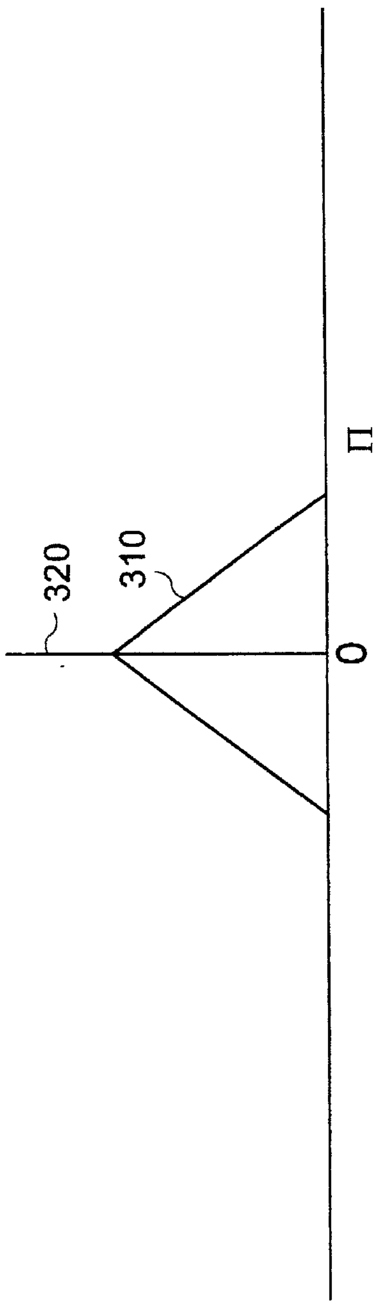
FIG. 3(*a*) is a graph illustrating the spectrum of an exemplar sampled signal.
Figure 3B:
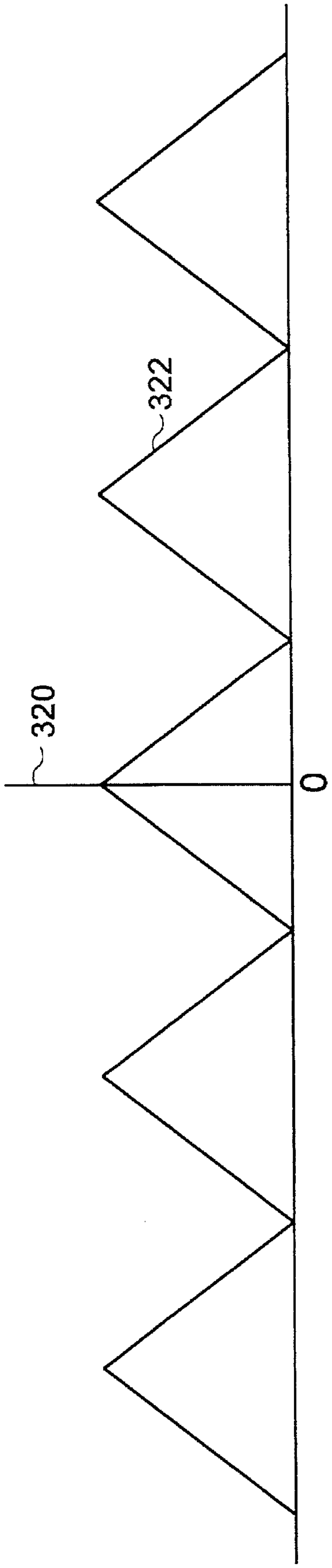

In the preferred embodiment, the interpolation of audio signals uses the poly-phase filtering technique. FIG. 3(*a*) illustrates a sample wave form depicting base-band signal spectrum 310 of a hypothetical signal. Spectrum 322 represented in FIG. 3(*b*) shows the result of interpolation of input spectrum 310. Low pass filtering of FIG. 3(*b*) removes the "images". The polyphase interpolation technique will often result in a closer approximation to the original signal than obtained by alternative techniques such as sample repetition, averaging, and curve fitting, obtaining less distortion of the output signal due to the incorporation of information including bandwidth and non-stationary behavior of the input signals.

Figure 4B:
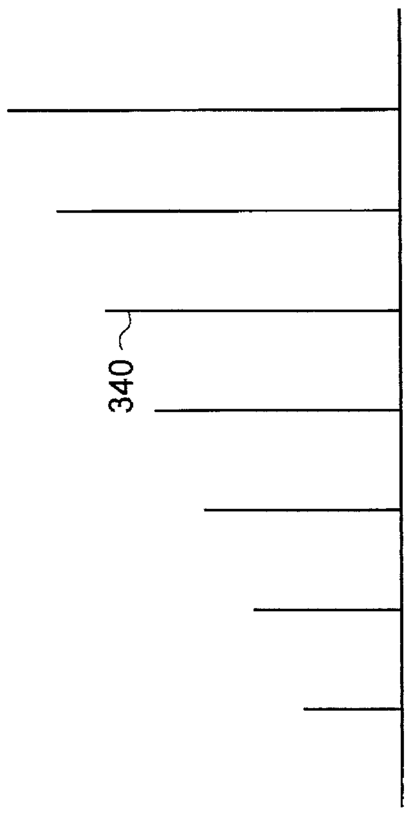
FIG. 4(*a*) is a graph illustrating the original, sampled signal.
Figure 4C:
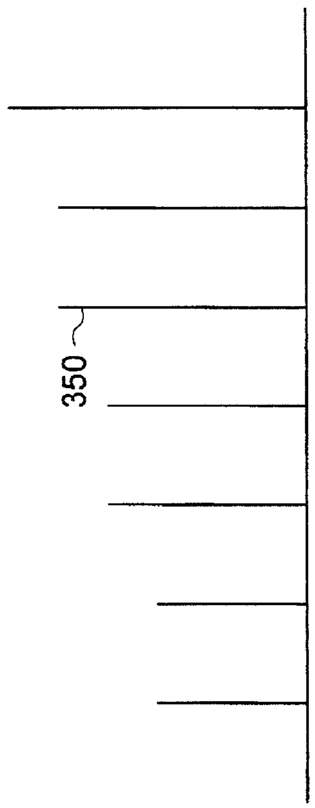
Figure 4A:
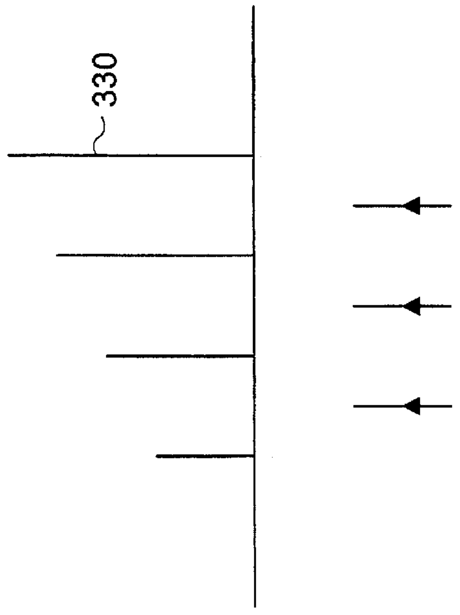

The alternative technique of sample repetition is implemented by repeating each preceding sample of original signal 330 at the locations shown by the arrows in FIG. 4(*a*) and results in sampled signal 350 as shown in FIG. 4(*c*). The alternative technique of sample averaging is implemented by averaging each adjacent pair of samples of original signal 330 and inserting an average sample between the averaged adjacent pair. By applying this technique to original signal 330, sampled signal 340 is obtained as shown in FIG. 4(*b*).

Another technique which may be used to increase the number of samples over an interval, which is not shown, is curve fitting. Curve fitting may result in a better fit than the linear (averaging) or repeated sample techniques, and may closely approximate or improve the spectral interpolation technique; however, the algorithms are usually more complex and time-consuming which may make them burdensome for real-time processing.

Figure 5:
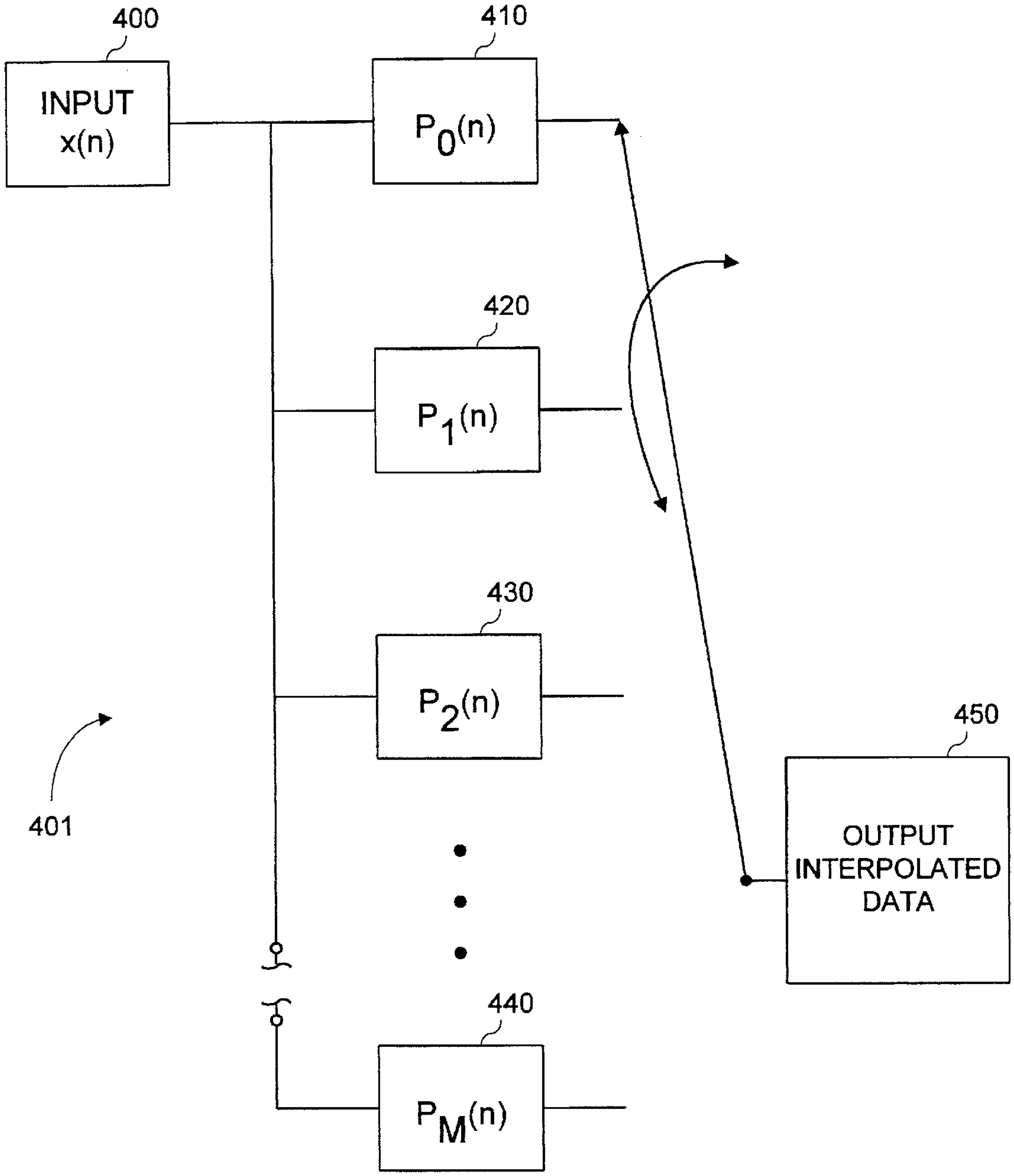
FIG. 5 is a block schematic diagram illustrating the interpolation scheme using a poly-phase filter.
Figure 5A:
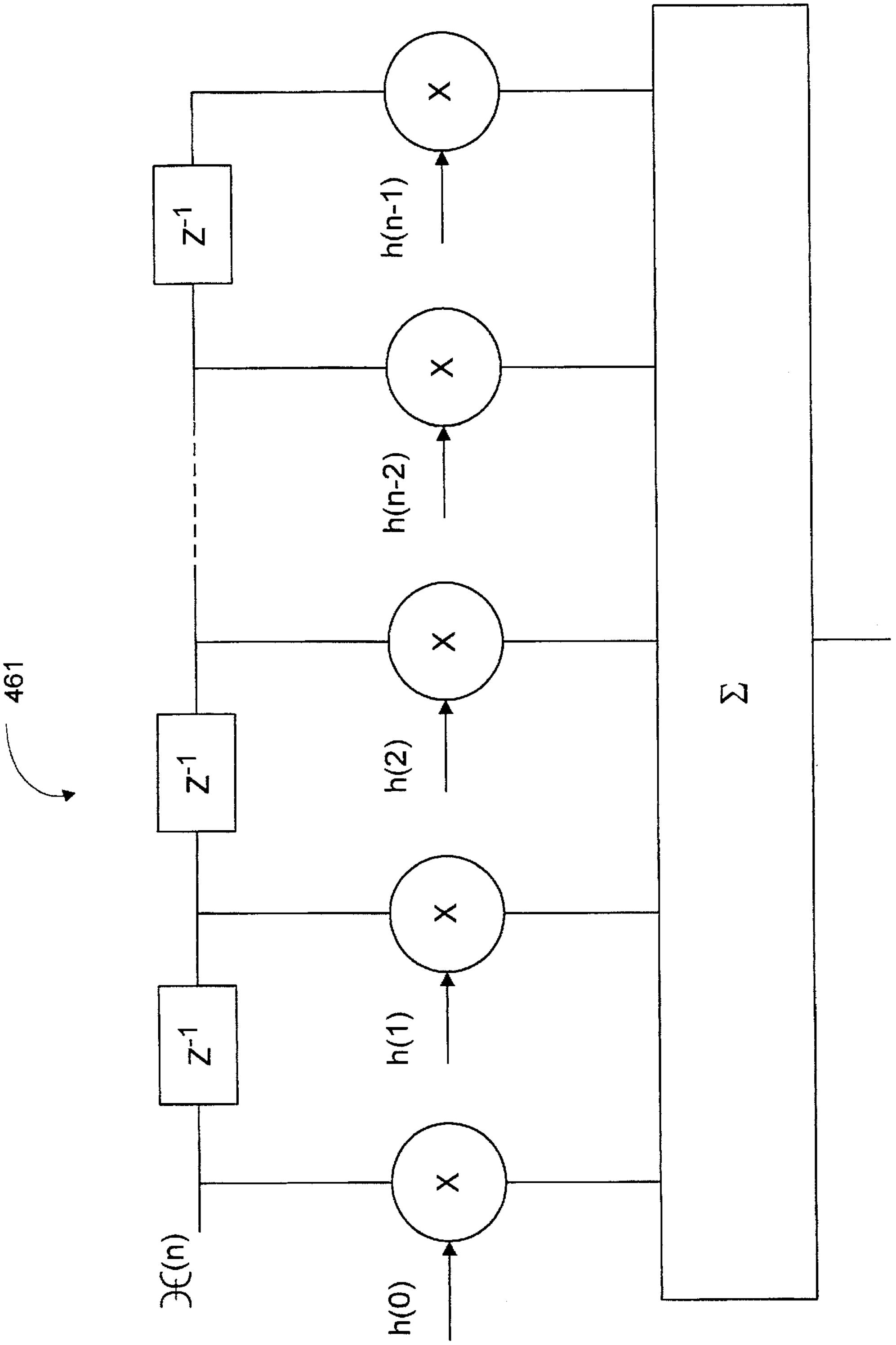

Referring now to FIG. 5, there is shown a block diagram of poly-phase filter 401 which may be used to implement the digital interpolators 250, 252, 254. Poly-phase filter 401 is implemented as a FIR (finite impulse response) filter which may be defined in the time domain by the expression $$y(m)=\sum_{n=0}^{N-1} h(n)x(m-n)$$

where x(n) corresponds to the input sample sequence, h(n) corresponds to the filter coefficients and y(n) corresponds to the output sequence. FIG. 5(*a*) shows an exemplar block diagram of a z-inverse implementation of FIR filter 461 which may be used to implement polyphase filter 401. Preferably, poly-phase filter 401 is chosen of a sufficient type and order such that the stop-band attenuation falls below the quantization noise level of the input signal, thus the total distortion and noise at the output is maintained below the quantization noise level at the input. Since the target sampling frequency has been preset to a CD sampling frequency, the same set of poly-phase coefficients may be used to calculate the interpolated samples for different inputs with different sampling frequencies. By using poly-phase filters, the sample values computed are close to the ideal value where the differentiated margin depends on the length of the FIR filter and the precision of the selected filter coefficients.

The input and the output sampling rate requires a common integer multiplication factor to minimize computation of unspecified samples. Poly-phase filter 401 may be subdivided into M sub-filters 410, 420, 430 and 440 associated with an M input sample sequence. Each of the sub-filters may have a similar structure to FIR filter 461 as shown in FIG. 5(*a*). For a particular output sampling rate, each of the sub-filters 410, 420, 430 and 440 provides a fixed delay (depending on the location of the sub-filter) output corresponding to the poly-phase coefficients required for the CD sampling frequency. In addition, sub-filters 410, 420, 430, and 440 may contain a lower order of degree than the original FIR filter 400. This method of implementation is efficient since it avoids multiply operations that results in zero value.

A more intuitive explanation of polyphase filtering is given here. Where a non-integer ratio sampling rate conversion (by say, M/N where M corresponds to the factor by which to increase the sampling rate and N corresponds to the factor by which to compress the sampling sequence of samples) is necessitated, zero-valued samples are inserted to increase the overall sampling rate by a factor of M. The increased sequence of samples may be compressed by a factor N by deselecting some of the samples. Prior to deselecting samples from the increased sample sequence, zero-valued samples should be adjusted by synthesizing more accurate values for the respective positions in the sample sequence. For example, assume the sampling rate is to be increased by a factor of 2.7, i.e. a non-integer sample rate conversion. First, the sample rate may be increased by 27 by padding 26 zeroes after each sample. The padded sample sequence may be passed through filter 401 to replace the zero samples with more accurate estimates of the original signal amplitudes. To achieve the desired 2.7X increased sampling rate, every 10th sample may be selected from the synthesized sequence.

Figure 6:
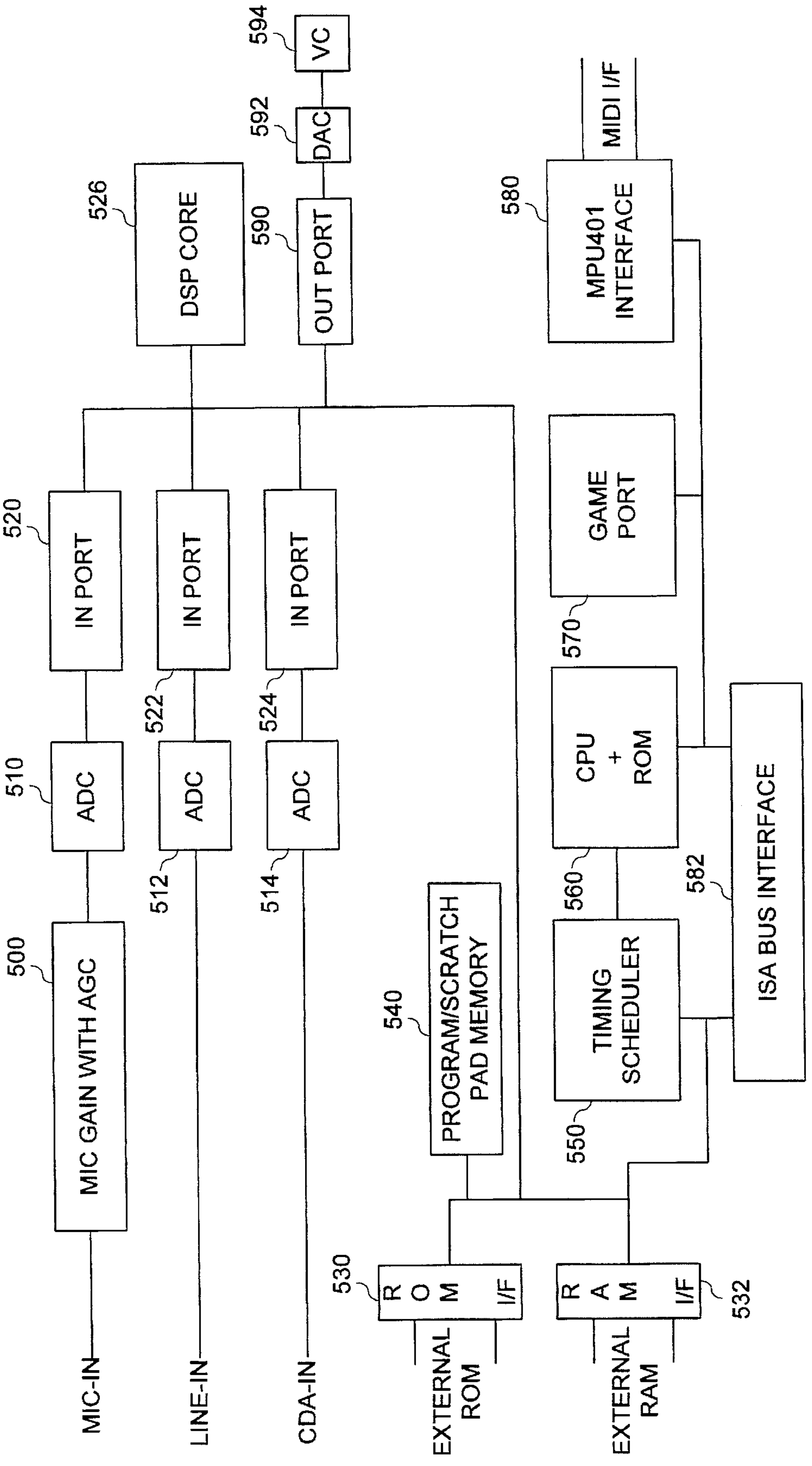
FIG. 6 is a pictorial schematic diagram of digital signal processing of the present invention.

Referring now to FIG. 6, there is shown a block diagram of a personal computer including a multimedia platform with a programmable DSP implementation. A portion of the programming for the DSP implementation of the digital multimedia platform is attached in Table 1: Process Flow Description. As described more fully above and determined from the pseudo-code of Table 1, multiple independent, audio inputs, such as from MIC-IN, LINE-IN, CD-IN, PC storage, and PC on-line, are digitally mixed using DSP core 526 to produce a combined audio output for delivery to output port 590.

The digital volume control can be designed with the hardware multiplier inside the DSP core 526. The range of the volume fluctuation is controlled with a simple multiplication factor in DSP Core 526. The volume level may be driven by software, thus it is possible to increase or decrease any incremental gain subject to the input data precision. The DSP software resolves any possible overflow of the data by saturating the output to the highest or lowest possible signal level.

From DSP 526, various processing inquiries and selections may be implemented as recited in Table 1. Input signals obtained from storage may require decompressing. Input signals derived from on-line may require conversion to digital (if so, this is provided external to the DSP core), de-formatting if in digital form, and volume adjustment. Input signals which arrive in digital form may further require interpolation through the polyphase filter. The polyphase filter may be implemented in terms of type, order, sub-filters, and gain factor through user-controlled programming instructions. Where the multimedia platform is operated in real-time, then the corresponding inverse operations may be implemented to return the combined audio signals to the external device. When the combined audio output signals are transmitted to a storage device, such as the hard disc drive, the signals may be compressed through the polyphase filter.

On delivery to the output port 590, the combined output signals may be converted to analog form with digital-to-analog (DAC) converter 592 and transmitted through output device 594, such as a speaker. For analog inputs, such as MIC-IN, LINE-IN, and CD-IN, analog-to-digital (ADC) converters 510, 512, 514 convert the respective input signals to digital form and deliver to IN PORTs 520, 522, 524 for input to DSP core 526. Prior to digital conversion, input signals from MIC-IN (microphone input) may be boosted by a microphone amplifier with automatic gain control (MIC GAIN WITH AGC) 500. After the input signals have been combined, the combined audio signals may be delivered to one of the PC storage devices, such as random access memory (RAM) 532, or output through ISA bus interface 582 or game port 570. The combined audio signals may be directed to various devices and locations for further processing or handling in accordance with executed instructions from central processor unit (CPU) 560 and timing scheduler 550. Such instructions may be provided through programming stored in read-only memory (ROM) 530, or interactively through user input scratch pad memory 540. Additional, requests or instruction may be received through ISA bus interface 582, game port 570, and MPU401 interface 580.

TABLE 1

PROCESS FLOW DESCRIPTION

```
INITIALIZE:
    select_ON_LINE_PLAY_or_STORAGE_ONLY0;
    enable_desired_input_channels0;
    set_volume_control_for_each_channel0;
    if STORAGE:=TRUE then
        {
        select_decimation_ratio0;
        }
    if ON_LINE_PLAY:=TRUE then
        {
        select EBU_or_ANALOG0;
        if ANALOG:=TRUE then
            {
            select_output_volume0;
            }
        if hard_disc_in_play_mode:=TRUE then
            {
            select_interpolation_rate0;
            if ANALOG:=TRUE then
                {
                select_hard_disc_volume_control0;
                }
            }
        }
end INITIALIZE;
PROCESS:
    for channel_number:=0 to channel_number:=maximum
        do
        {
            if input_signal:=TRUE then
                {
                select_desired_polyphase_subfilter0;
                calculate_FIR_filter_output0;
                multiply_output_by_gain_factor0;
                }
        }
    for channel_number:=0 to channel_number:=maximum
        do
        {
            if input_signal:=TRUE then
            {
            mixer_output:=mixer_output+channel_output;
            }
```

TABLE 1-continued

PROCESS FLOW DESCRIPTION

```
        }
    if decimation:=TRUE then
        {
        select_desired_polyphase_filter0;
        calculate_fir_filter_output0;
        }
    if hard_disc_in_play_mode:=TRUE then
        if hard_disc_data_decimated:=TRUE then
        {
        select_desired_polyphase_subfilter0;
        calculate_fir_filter_output0;
        }
    else
        {
system_output:=mixer_output * on_line_volume +
hard_disc_output * hard_disc_volume;
system_output:=final_output * final_volume_gain;
        }
    if STORAGE:=TRUE then
        {
        if compression:=TRUE then
            {
            select_desired_polyphase_subfilter0:
            calculate_fir_filter_output0:
            }
        }
end PROCESS;
```

What is claimed is:

1. A digital multimedia system for producing a combined digital output signal from multiple signal sources, comprising:

a first input, for receiving a first digital input signal having a first sampling rate;

a second input, for receiving a second digital input signal having a second sampling rate that differs from the first sampling rate;

a pre-processing circuit, having a plurality of inputs and outputs, a first pre-processing circuit input receiving the first digital input signal, a second pre-processing circuit input receiving the second digital input signal, a first pre-processing circuit output providing the first digital input signal at the first sampling rate, the pre-processing circuit including a sampling rate modification circuit for receiving the second digital input signal at the second sampling rate, converting the sampling rate of the second digital input signal from the second sampling rate to the first sampling rate, and outputting the second digital input signal at the first sampling rate to a second pre-processing circuit output; and, a mixer circuit, having a plurality of inputs and an output, a first mixer circuit input receiving, from the first pre-processing circuit output, the first digital signal at the first sampling rate, a second mixer circuit input receiving, from the second pre-processing circuit output, the second digital signal at the first sampling rate, the mixer circuit digitally mixing the first and second digital signals to provide a combined digital output signal.

2. The system according to claim 1, wherein the preprocessing circuit includes a volume controller for digitally adjusting the gain of at least one of the first and second digital input signals.

3. The system according to claim 2, wherein the pre-processing circuit includes a de-formatter circuit for digitally de-formatting at least one of the first and second digital input signals.

4. The system according to claim 1, wherein the sampling rate modification circuit includes a decimator circuit for converting the second digital input signal sampling rate from the second sampling rate to the first sampling rate.

5. The system according to claim 4, wherein said decimator circuit comprises a poly-phase filter.

6. The system according to claim 1, further comprising:

a personal computer interface circuit for transferring information between the mixer and a personal computer.

7. The system according to claim 1, further comprising:

an output port, including an input and an output, for receiving the combined digital output signal;

a digital to analog converter, including an input and an output, the digital to analog converter input connected to the output port output; and a speaker, coupled to the digital to analog converter output.

8. The system according to claim 1, wherein the sampling rate modification circuit includes an interpolator circuit for converting the second digital input signal sampling rate from the second sampling rate to the first sampling rate.

9. The system according to claim 8, wherein the interpolator circuit comprises a poly-phase, finite impulse response filter.

10. The system according to claim 1, wherein the first sampling rate is the compact disc audio sampling rate.

11. The system according to claim 1, further comprising:

a third input, for receiving a first analog input signal.

12. The system according to claim 11, wherein the pre-processing circuit includes an analog to digital converter, for receiving the first analog input signal, converting the first analog input signal to a third digital input signal, and providing the third digital input signal to a third pre-processing circuit output.

13. In a system comprising a first input, a second input, a pre-processing circuit, a sampling rate modification circuit, and a mixer circuit, a method for producing a a combined digital output signal from multiple signal sources, the method comprising:

receiving a first digital input signal having a first sampling rate at the first input;

receiving a second digital input signal having a second sampling rate that differs from the first sampling rate at the second input;

providing the first digital input signal to a first pre-processing circuit input; outputting, at a first pre-processing circuit output, the first digital input signal at the first sampling rate;

providing the second digital input signal to a second pre-processing circuit input;

providing the second digital input signal from the second pre-processing circuit input to a sampling rate modification circuit;

converting the sampling rate of the second digital input signal from the second sampling rate to the first sampling rate;

outputting, at a second pre-processing circuit output, the second digital input signal at the first sampling rate;

providing the first digital input signal at the first sampling rate from the first pre-processing circuit output to a first mixer circuit input;

providing the second digital input signal at the first sampling rate from the second pre-processing circuit output to a second mixer circuit input; and digitally mixing the first and second digital signals using the mixer circuit to produce the combined digital output signal.

14. The method of claim 13, further comprising:

digitally adjusting the gain of at least one of the first and second digital input signals.

15. The method of claim 14, further comprising: de-formatting at least one of the first and second digital input signals.

16. The method of claim 13, wherein the sampling rate converting step includes digitally interpolating the second digital input signal to convert the second digital input signal sampling rate from the second sampling rate to the first sampling rate.

17. The method of claim 16, wherein the interpolating step includes filtering the second digital input signal using a poly-phase, finite impulse response filter.

18. The method of claim 13, wherein the sampling rate converting step includes digitally decimating the second digital input signal to convert the second digital input signal sampling rate from the second sampling rate to the first sampling rate.

19. The method of claim 18, wherein the decimating step includes filtering the second digital input signal using a poly-phase filter.

20. The method of claim 13, wherein the first sampling rate is the compact disc audio sampling rate.

21. The method of claim 13, further comprising:

receiving a first analog input signal at a third input;

providing the first analog input signal to a third pre-processing circuit input;

providing the first analog input signal from the third pre-processing circuit input to an analog to digital converter;

converting the first analog input signal to a third digital input signal using the analog to digital converter;

outputting, at a third pre-processing circuit output, the third digital input signal;

providing the third digital input signal from the third pre-processing circuit output to a third mixer circuit input; and wherein the digital mixing step includes digitally mixing the first, second and third digital signals using the mixer circuit to produce the combined digital output signal.

22. The method of claim 13, wherein, in the sampling rate converting step, the ratio of the first sampling rate to the second sampling rate or the second sampling rate to the first sampling rate exceeds 2:1.

* * * * *